United States Patent
Amano et al.

(10) Patent No.: US 6,781,783 B2
(45) Date of Patent: Aug. 24, 2004

(54) MAGNETIC DISK APPARATUS

(75) Inventors: Yasuo Amano, Tokyo (JP); Shigeo Nakamura, Tokyo (JP); Osamu Narisawa, Tokyo (JP); Mikio Tokuyama, Tokyo (JP); Masahito Kobayashi, Tokyo (JP); Hiroyasu Sasaki, Tokyo (JP); Yuuji Fujita, Tokyo (JP)

(73) Assignee: Hitachi, Ltd. (JP)

( * ) Notice: Subject to any disclaimer, the term of this patent is extended or adjusted under 35 U.S.C. 154(b) by 270 days.

(21) Appl. No.: 10/024,984

(22) Filed: Dec. 18, 2001

(65) Prior Publication Data

US 2002/0080515 A1 Jun. 27, 2002

(30) Foreign Application Priority Data

Dec. 18, 2000 (JP) ........................................ 2000-388188
Jul. 19, 2001 (JP) ........................................ 2001-218953

(51) Int. Cl.[7] ............................................. G11B 21/02
(52) U.S. Cl. ...................................................... 360/75
(58) Field of Search ........................ 360/75, 66, 78.06, 360/78.08, 264.2, 266.3, 68, 244.1, 78.02, 234.5

(56) References Cited

U.S. PATENT DOCUMENTS

| | | | | |
|---|---|---|---|---|
| 6,084,746 A | * | 7/2000 | Shiraishi et al. | 360/244.1 |
| 6,134,084 A | * | 10/2000 | Ohwe et al. | 360/244.1 |
| 6,144,530 A | * | 11/2000 | Shiraishi et al. | 360/244.1 |
| 6,173,485 B1 | * | 1/2001 | Shiraishi et al. | 29/603.06 |
| 6,202,288 B1 | * | 3/2001 | Shiraishi et al. | 29/603.03 |
| 6,266,213 B1 | * | 7/2001 | Hiraoka | 360/244.1 |
| 6,268,980 B1 | * | 7/2001 | Shiraishi et al. | 360/234.5 |
| 6,282,062 B1 | * | 8/2001 | Shiraishi | 360/244.1 |
| 6,333,828 B1 | * | 12/2001 | Morita et al. | 360/68 |
| 6,339,519 B1 | * | 1/2002 | Nomura et al. | 360/244.1 |
| 6,388,840 B1 | * | 5/2002 | Ohwe | 360/244.1 |
| 6,437,944 B2 | * | 8/2002 | Ohwe et al. | 360/244.1 |
| 6,498,702 B1 | * | 12/2002 | Shimizu et al. | 360/244.1 |
| 6,522,502 B1 | * | 2/2003 | Shiraishi et al. | 360/244.1 |
| 6,523,249 B1 | * | 2/2003 | Matsumoto et al. | 29/603.03 |
| 6,549,373 B1 | * | 4/2003 | Shiraishi et al. | 360/244.11 |
| 6,564,988 B1 | * | 5/2003 | Shiraishi et al. | 228/110.1 |
| 6,594,104 B2 | * | 7/2003 | Masuda et al. | 360/78.02 |

FOREIGN PATENT DOCUMENTS

| | | |
|---|---|---|
| JP | 11-195215 | 7/1999 |
| JP | 2000-113610 | 4/2000 |

* cited by examiner

Primary Examiner—David Hudspeth
Assistant Examiner—Fred F. Tzeng
(74) Attorney, Agent, or Firm—Townsend and Townsend and Crew LLP

(57) ABSTRACT

Provided is a magnetic disc apparatus comprising a magnetic head for writing and reading data to and from a magnetic disc, a slider for floating up the magnetic head from the magnetic disc on rotation, a suspension having an IC chip mounting surface, for supporting the slider, a positioning mechanism for positioning a magnetic head at a predetermined position, and an IC chip mounted on the IC chip supporting surface of the suspension, wherein the rate of variation in temperature difference between opposite sides of the IC chip mounting position as a center on the IC chip mounting surface is set to be below about 3.5 K/sec. Thereby it is possible to restrain the averaged seek time for the magnetic disc from becoming longer.

14 Claims, 9 Drawing Sheets

MAGNETIC DISK APPARATUS

BACKGROUND OF THE INVENTION

The present invention relates to a magnetic disc apparatus, and in particular to a magnetic disc apparatus comprising a magnetic head for writing and reading data to and from a magnetic disc, a slider for floating up the magnetic head from the magnetic disc, a suspension for supporting the slider, and an IC chip connected on the suspension, and as well to a servo-track slider for writing servo-tracks on a magnetic disc.

These years, as to magnetic disc apparatuses, the demand for increasing the recording capacity and miniaturizing the size while speeding up the reading and the writing have become higher and higher, and accordingly, there have been attempted the technological development for increasing the recording density and the transfer speed. One of problems in the high speed transmission technology is a signal transmission to and from a magnetic head.

Heretofore, an IC for processing signals from a magnetic head is mounted in a part (a carriage section in general) after the position where wirings from a plurality of magnetic heads are integrated. In order to speed up the transmission of signals, it is required to shorten the rise-up time or the fall-down time of pulse signals transmitted from the magnetic head. However, since the wiring for transmitting signals has a parasitic capacity and an inductance component inherent thereto, there has been raised such a problem that the time delay is caused as to steep rise-up or fall-down of signals. Further, since this problem relates to the length of wiring, it is clear, the longer the wiring, the greater the disadvantage.

In view of the above-mentioned situation, as to the wiring length between the position where the IC is mounted, and the magnetic head, the parasitic capacitance and the inductance components inherent to the wiring are not negligible, and accordingly, there have been found limits. Thus, it has been tried to mount, for respective magnetic heads, required parts of a control circuit of the IC, including a signal amplifying part used as a preamplifier, at a position which is near to each of magnetic heads so that the wiring length from the magnetic head becomes shorter (these IC will be hereinbelow referred to "head ICs").

As to the mounting position, it is mounted on a suspension as disclosed in JP-A-11-195215.

Heat generation from the above-mentioned head IC has been already known as one of the problems which would occur in the case of mounting the head IC on the suspension. In order to lower the high temperature of the IC caused by the heat generation, the JP-A-11-195215 proposes the mounting position of the head IC which is on the suspension and which is at a surface faced to a magnetic disc.

Specifically, due to the heat generation from the head IC, as a countermeasure for deformation of the suspension or the head arm, the head IC is mounted in a part which is center in both in-plan direction and thickenesswise direction of the head arm, as disclosed in JP-A-2000-113610.

SUMMARY OF THE INVENTION

By the way, throughout experiments carried out by the applicants, it has been found a problem in which an averaged seek time becomes longer in a magnetic disc apparatus incorporated with a head IC than in a magnetic disc apparatus incorporated with no head IC. No such a point is shown or suggested from the above-mentioned prior art examples.

An object of the present invention is to restrain the averaged seek time from becoming longer. The positioning of a magnetic head is carried out by changing over, in accordance with a condition in which the magnetic head is positioned, the operation among three kinds of modes, that is, a mode in which a magnetic head is moved at a high speed to a position around its desired position in accordance with positional information on a magnetic disc, that is, the so-called track information, a mode in which the magnetic head is finely adjusted to the desired position and a tracking mode in which the magnetic head is caused to follow the desired position, and the seek time is a time elapsing from the time when the magnetic head is to move the desired position to the time when the operation is shifted into the tracking mode.

It has been clearly found from the results of experiments and studies made by the applicants that the above-mentioned problem is caused by a rate of variation in temperature difference between the inner side and the outer side of the head IC, caused by heat which is generated from the IC head and which raises the temperature of the suspension around the head IC.

More specifically, it has been found that a displacement of the head part at the tip end of the suspension is caused as the temperature difference between both sides of the suspension on which the IC chip is mounted, is increased upon writing of servo-tracks (servo pattern), and accordingly, the servo-pattern cannot be settled to equal pitches until the above-mentioned temperature difference becomes constant. Further, should the positioning of the head is carried out for reading operation or writing operation in accordance with the servo-pattern with unequal pitches, vibration during the positioning of the head becomes larger, and accordingly, the positioning speed is lowered, resulting a longer seek time.

Further, it has been found that the temperature difference between both sides of the suspension become constant when only three seconds elapses from the time of starting the writing of the servo-track (servo-pattern), and thereafter, the pitches of servo-pattern become equal to one another.

To the end, according to the present invention, there is provided a magnetic disc apparatus comprising a magnetic head for writing or reading data to and from a magnetic disc, a slider for floating up the magnetic head from the magnetic disc on rotation, a suspension for supporting the slider, a positioning mechanism for positioning the magnetic head to a predetermined radial position, and an IC chip mounted on the suspension, wherein a rate of variation in temperature difference between opposite sides of a position where the IC chip is mounted, on an IC mounting surface of the suspension is set to be less than 3.5 k per sec.

Further, the rate of variation in temperature difference is preferably set to.be less than 1.4 K per sec. Moreover, the magnetic disc apparatus is caused to carry out spurious writing operation until the rate of variation in temperature difference becomes less than 3.5 K per sec. Further the magnetic disc apparatus is caused to carry out spurious writing operation until the rate of variation in temperature difference becomes preferably less than 1.4 K.

Further, the spurious wiring operation is carried out by at least three seconds in a part other than data tracks on a magnetic disc. Further, the above-mentioned IC chip is a signal amplifier for writing and reading data with the use of a magnetic head. Further, the above-mentioned spurious writing operation causes the above-mentioned IC chip to write data which is invalid for the apparatus, on the magnetic disc. Further, the above-mentioned rate of variation in temperature difference is that from the time of starting of writing of a servo-pattern.

Further, there is provided a magnetic disc apparatus comprising a magnetic head for writing or reading data to and from a magnetic disc, a slider for floating up the magnetic head from the magnetic disc on rotation, a suspension for supporting the slider, a positioning mechanism for positioning the magnetic head to a predetermined radial position, and an IC chip mounted on the suspension, wherein spurious writing operation is carried out by a time longer than at least 3 sec in a part other than data tracks on the magnetic disc during the operation of writing a servo-pattern.

Further, the above-mentioned spurious writing operation causes the IC chip to write data invalid for the apparatus, on the magnetic disc.

Further, the rate of an area of signal lines on a surface underneath the position where the IC chip is mounted, is set to be larger on the inner peripheral side of the magnetic disc than on the outer peripheral side thereof, when it is compared between both sides of the IC chip as a center on the surface. Further, signal lines arranged in a part underneath the IC chip are formed at least by the underneath surface of the IC chip in its entirety, or signal lines having an area larger than the area of the IC chip, and the signal lines are formed so as to be led toward the inner peripheral side of the magnetic disc.

Further, the signal lines are formed so as to be led toward one side of the suspension, remote from the magnetic head. Further, the signal lines underneath the suspension are formed of dummy copper wiring, and power supply lines for the IC chip is arranged on the inner peripheral side of the magnetic disc.

Further, holes are formed in the suspension, and the area of each of the holes on the outer peripheral side of the magnetic disc is smaller than that on the inner peripheral side thereof while the number of the holes on the outer peripheral side of the disc is greater than that on the inner peripheral side thereof so that the total of the areas of the holes on the outer peripheral side of the magnetic disc is equal to that on the inner peripheral side thereof.

According to the present invention, as stated above, by taking the effect of the heat generation from the IC chip during the drive of the magnetic disc into consideration, servo-tracks can be written at substantially equal pitches. As a result, it is possible to restrain the seek time from becoming longer.

BRIEF DESCRIPTION OF THE INVENTION

These and other features, objects and advantages of the present invention will become more apparent from the following description when it is taken in conjunction with the accompanying drawings wherein.

DETAILED DESCRIPTION OF PREFERRED EMBODIMENTS

Figure 1:
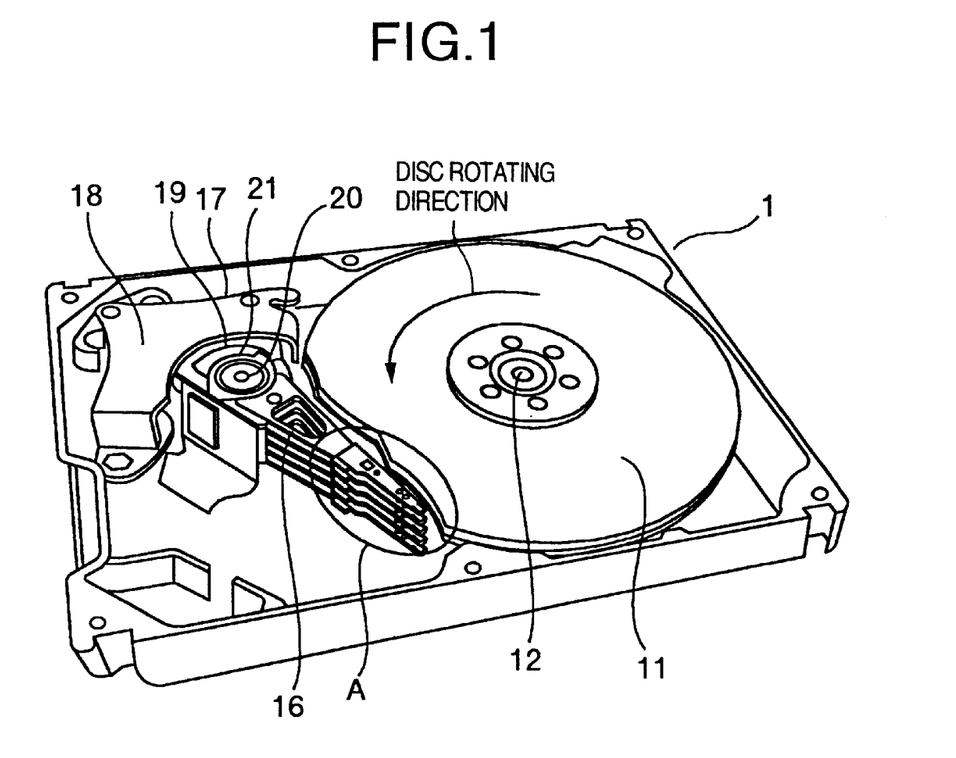
FIG. 1 is a view illustrating an example of the configuration of a magnetic disc apparatus.

Explanation will be made of embodiments of the present invention with reference to the drawings:

Referring at first to FIG. 1, there are shown a magnetic disc apparatus 1, a magnetic disc 11 having surfaces which are covered with magnetic films, a spindle motor 12 for rotating a magnetic disc 11, a carriage 16 serving as a suspension support member, a voice coil motor 17, a permanent magnet 18, a coil 19, a carriage rotary shaft 20 serving a rotational center for positioning a magnetic head by means of the voice coil motor 17, and a bearing 21.

Figure 2:
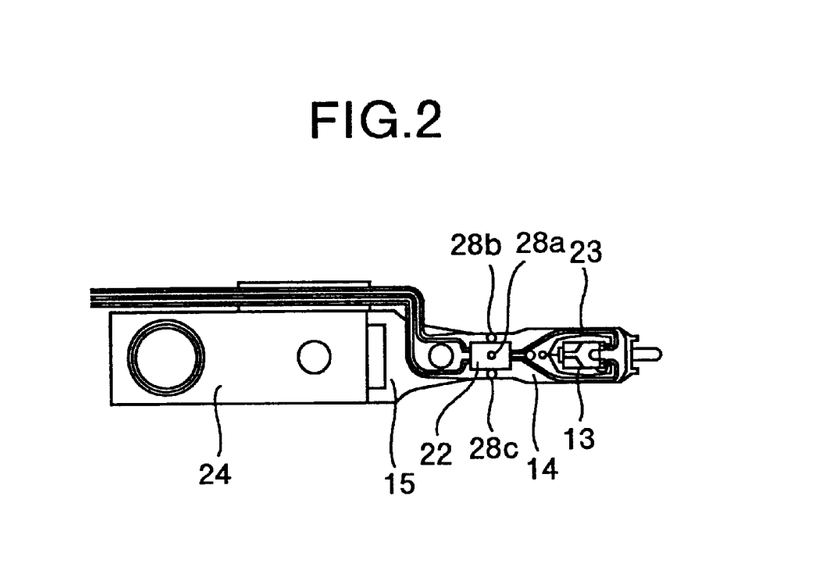
FIG. 2 is an enlarged view illustrating a suspension assembly part which constitutes the magnetic disc apparatus.

Further, referring to FIG. 2, there are shown a slider 13 for floating up the magnetic head above the magnetic disc by a predetermined gap from the latter, a flexure 14 for correcting the posture of the magnetic head, relative to the magnetic disc, a suspension 15 for resiliently supporting the magnetic head and the slider 13, a head IC 22 as a preamplifier for amplifying a control signal for the magnetic head, wiring 23 set up on the flexure, for transmitting electrical signals from the slider 13, and a mount 24 fixed to the carriage 16 by calking or the like.

Next, explanation will be made of the configuration of connection of the head IC with reference to FIGS. 3 and 4. The flexure 14 which is fixed to the suspension 15 made of stainless steel by laser spot welding or the like, and which is also made of stainless steel, and is covered with a polyimide insulating layer 221 which is formed thereover with a wiring layer 23. The wiring layer is composed of wires 23a led from the head side, and wires led to the carriage side, and pads 25 are formed for connection with the head IC underneath the latter. The pads 25 are gold-plated. Meanwhile, gold bumps 26 are provided to electrodes in the head IC, and are connected to the pads 25, and the pads of the wiring layer are connected to the bumps by ultrasonic joint or the like.

It is noted that not only gold bumps but also solder may be used in this IC connection method. Reinforcing resin 27, that is, the so-called under-fill, is formed between the head IC and the flexure in order to reinforce the connection therebetween. The writing and reading signals from and to the magnetic head are amplified by the head IC and are transmitted between a controller (which is not shown) in the body of the magnetic disc apparatus and an external computer.

In general, in a magnetic disc apparatus, a head assembly part (A part) shown in FIG. 1 is arranged at each of both surfaces of the magnetic disc 11. For example, in a magnetic disc apparatus incorporating three magnetic discs, six head assembly parts are incorporated.

A magnetic disc incorporated in a magnetic disc apparatus is arranged thereon with servo-data for specifying positions of writing and reading data by means of magnetic heads, at predetermined intervals in the circumferential direction of the magnetic disc, and the servo-data are previously recorded on the magnetic disc at predetermined radial and circumferential positions. That is, the magnetic head during writing and reading of signals is positioned by means of servo-tracks.

These servo-tracks are written in such a way that a servo-pattern is written on each of data surfaces of a magnetic disc by means of a servo-track writer (STW) after the assembly of the magnetic disc apparatus is completed, or such a way that a magnetic disc which has been previously written with a servo-pattern on each of its data surface by means of a servo-track writer, is incorporated in the magnetic disc apparatus.

At first, explanation will be made of the former type in which the servo-pattern is written after completion of the assembly of the magnetic disc apparatus with reference to FIG. 5 in which there are shown a magnetic disc apparatus 1 from which a closing cover (which is not shown) is removed, an external drive mechanism 29, a drive arm 30, a guide pin 31, a laser length measuring machine 32, and a mirror 33. The drive arm 30 is rotated by means of the external drive mechanism 29 so as to press the guide pin 31 against a side surface of the carriage 16 in order to successively displace the magnetic head, thereby the track data are written. At this stage, the drive arm 30 is precisely fed by means of the mirror 33 mounted thereon and the length measuring machine 32, and accordingly, the servo-tracks to be written on the magnetic disc can be recorded at precise pitches.

Figure 6:
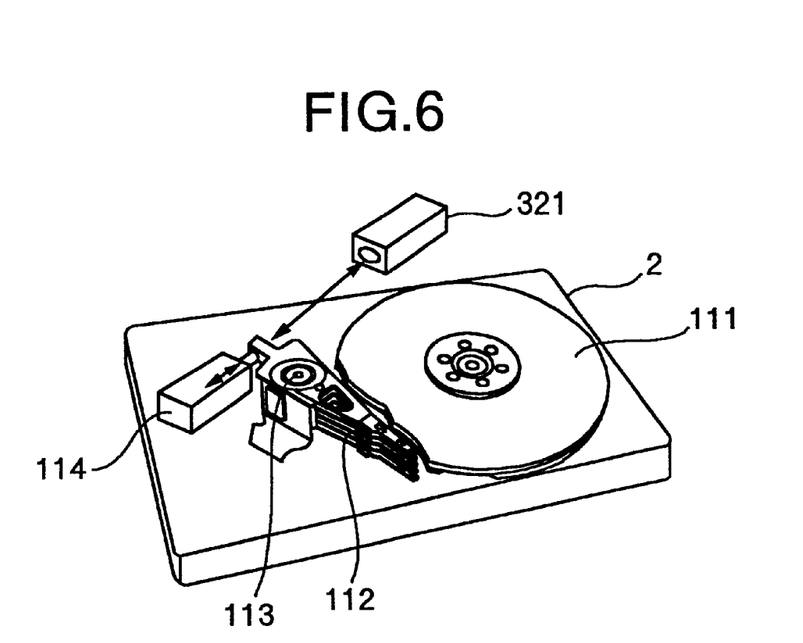
FIG. 6 is an external view illustrating another example of a servo-track writer.

Next, explanation will be made of the later type in which a magnetic disc on which servo-tracks have been previously written is incorporated in the magnetic disc apparatus with reference to FIG. 6. A servo-track writer 2 exclusive for writing servo-tracks is composed of a magnetic disc 111 for which the servo-tracks are written, a drive device (which is not shown) for rotating the magnetic disc, a magnetic head support 112, a magnetic head support rotating mechanism 113, a magnetic head drive mechanism 114, and a laser length measuring machine 32, which are similar to those in the magnetic disc apparatus. The way of writing servo-tracks is the same as mentioned above, except that the magnetic disc is removed from the writer after the servo-tracks are written, and is then incorporated in the magnetic disc device.

Next, with the use of the above-mentioned former magnetic disc apparatus or the magnetic disc apparatus which is completed by the servo-track writer and the like, experiments were made as to the reading and writing of data, it was resulted that the time for positioning the magnetic head, that is, the seek time become disadvantageously longer. Such a disadvantage will be discussed below:

Referring to FIG. 2, thermocouples were provided at thermocouple mounting positions 28a, 28b, 28c on the IC head 22 and on both sides of the head IC 22 in order to measure temperatures. That is, the position 28a is adapted to measure a temperature of the head IC 22, and the positions 28b, 28c are adapted to measure temperatures on both sides of the head IC 22, that is, the position 28b is on the side (the inner peripheral side) near to the center of the magnetic disc while the position 28c is the side (the outer peripheral side) remote from the center of the magnetic disc within the IC chip mounting surface of the suspension, with respect to the IC chip mounting position as a center.

It can be understood in this specification that the inner peripheral side is near the center of the magnetic disc and the outer peripheral side is remote from the center thereof.

Figure 7:
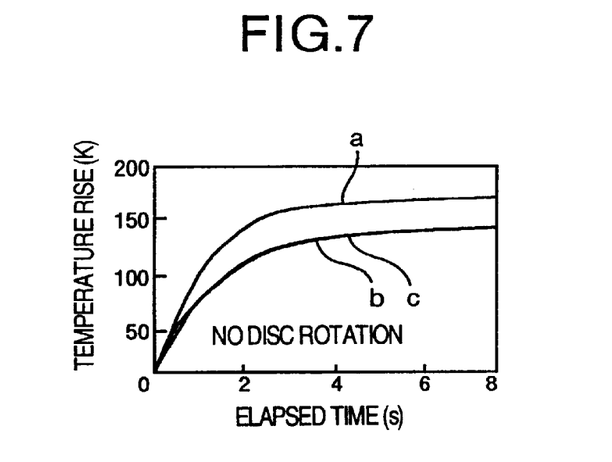
FIG. 7 is a view for explaining the temperature around the head IC when a disc is not rotated.
Figure 8:
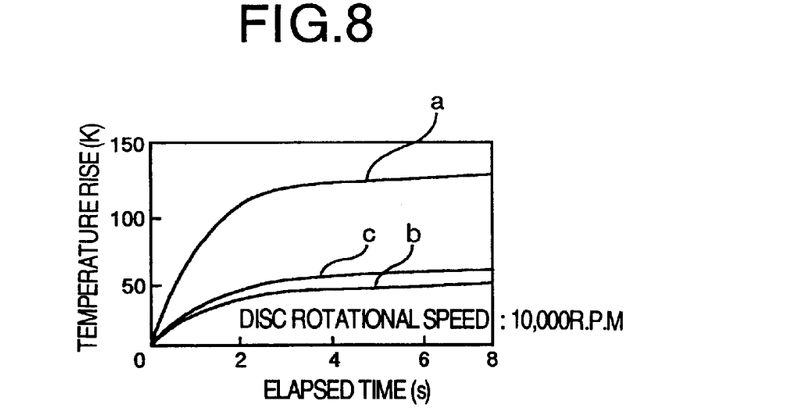
FIG. 8 is a view for explaining the temperature around the head IC when the magnetic disc is rotated.

It is noted that the IC chip with which the experiments were carried out, were specially prepared for the experiments so that its heating value can be controlled, with estimation of a consumption power as 500 mW during writing. FIGS. 7 and 8 show results of measurement of temperatures carried out while a power of 500 mW was supplied to the IC chip during writing on an experimental magnetic disc. FIG. 7 shows measured temperatures in the case of no rotation of the disc 11 while FIG. 8 shows measured temperatures in the case of rotation of the disc 11 at a speed of 10,000 r.p.m. Further, a, b and c in these figures correspond to the positions 28a, 28b, 28c where the thermocouples were mounted, respectively. In the case of no rotation of the magnetic disc, a temperature difference between the IC (a) and the parts (b, c) of the flexure was 20 K, but substantially no temperature difference between the parts (b, c), that is, between the inner peripheral side and the outer peripheral side on the flexure, was appreciated. It has been found that, in the case of rotation of the magnetic disc, the temperature difference between the inner peripheral side and the outer peripheral side became about 15 K in such a condition that the inner peripheral side was saturated in comparison with the outer peripheral side.

Figure 10:
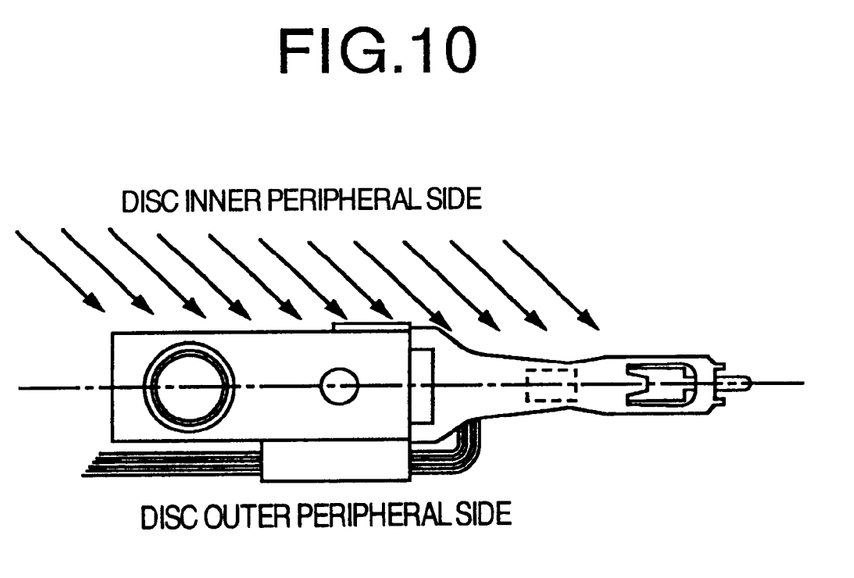
FIG. 10 is a view for explaining streams of air from the disc.

Further, about three seconds elapsed until it was saturated. The reason why the temperature difference is caused through rotation of the disc will be hereinbelow explained. The magnecti disc 11 which is rotated at a speed of 10,000 r.p.m. in a direction shown in FIG. 1, causes air streams accompanied by the rotation. The speed of the air streams depend upon the position of the magnetic head and the rotational speed of the disc, and the speed of the air stream was about 46 m/sec around the outer periphery at a disc rotational speed of 10,000 r.p.m. Further, the direction of the airstreams is circumferential, and, as shown in FIG. 10, is from the rear on the inner peripheral side of the disc as viewed from the suspension and the head IC. Accordingly, the flexure which has been uniformly heated is cooled by a degree which is higher on the inner peripheral side (upwind side) of the disc, than on the outer peripheral side thereof. That is, the temperature difference is always caused in such a condition that the temperature of the inner peripheral side is lower than that of the outer peripheral side.

Figure 11:
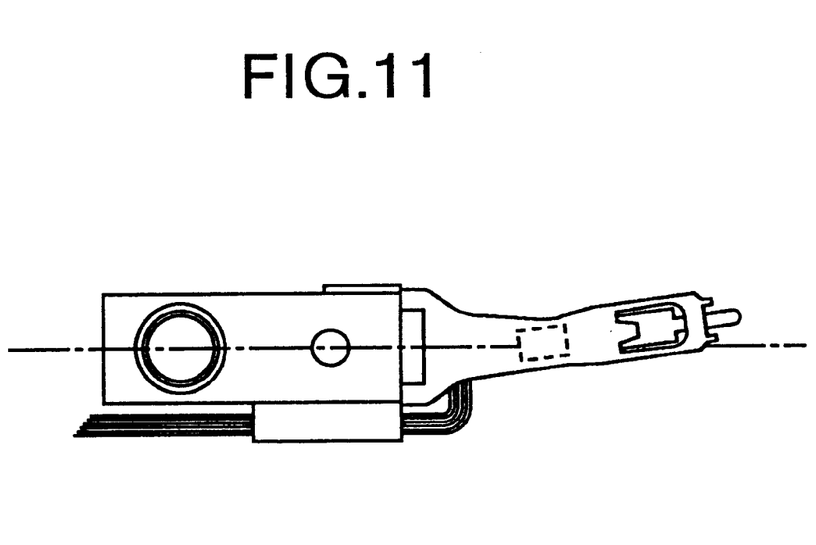
FIG. 11 is a view for explaining a condition of deformation of the suspension.

Further, the temperature difference between the inner peripheral side and the outer peripheral side would cause deformation so that the tip end of the head is shifted toward the inner periphery of the disc, as shown in FIG. 11, around the head IC 22. That is, due to a thermal expansion coefficient of a material from which the suspension is formed, and the temperature difference between the inner and outer peripheral sides, the degree of expansion is different between the inner peripheral side and the outer peripheral side, that is, the tip end of the head is positionally deviated (shifted).

Figure 9:
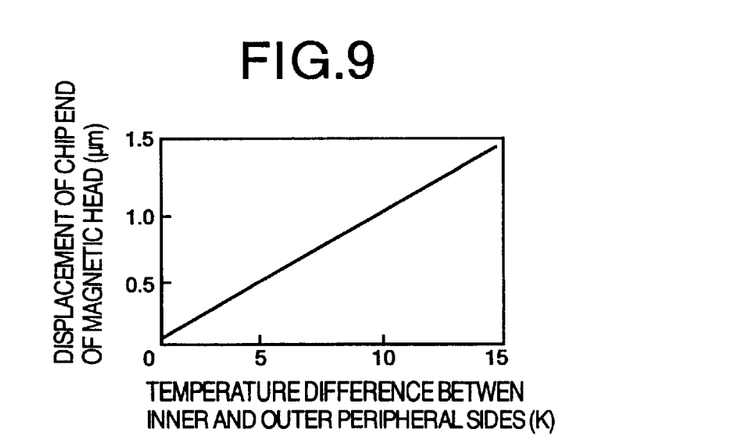
FIG. 9 is a view for explaining a temperature difference between opposite sides of the IC and a displacement of the tip end of the head.

Referring to FIG. 9 which shows the relationship between the temperature difference between the inner peripheral side and the outer peripheral side of the IC, and the shift of the tip end of the magnetic disc. As understood from this figure, both are proportional to each other, and accordingly, for example, a shift of 1 $\mu$m is caused with respect to a temperature difference of about 10 K. This value substantially corresponds to that calculated from the linear expansion coefficient ($16.5 \times 10^{-6}$) of stainless steel from which the flexure is formed, and the distance (about 4.5 mm) between the IC and the magnetic head.

By the way, when servo-tracks (a servo-pattern) are to be written on a magnetic disc, the carriage, rather than the magnetic head, is precisely positioned for writing the servo-tracks. Should the tip end of the magnetic head be shifted due to deformation, as mentioned above, forward of the carriage, the servo-track cannot be written at precise positions. In particular, if servo-tracks (a servo-pattern) are written before the temperature difference is saturated, track pitches are deviated, that is, no equal track pitches cannot be obtained.

In the case of using as a disc apparatus, variation in the track pitches apparently becomes equivalent to variation in the gain of the servo-loop. The larger the variation in the gain, the larger the vibration of the magnetic head, the speed with which the magnetic head is positioned becomes lower so that the performance of the magnetic disc apparatus is deteriorated, resulting in a longer seek time. Thus, it is required to set a positional deviation during writing of the servo-pattern within an allowable range.

Meanwhile, after the temperature difference is saturated, the writing can be made while the present condition is maintained, and accordingly, there would be never caused the problem of deviation of the track pitches. Accordingly, it is important to take a countermeasure upon initiation of writing servo-tracks (a servo-pattern) on a magnetic disc, that is, during such a period from the time of starting energization of the IC chip to the time when the temperature difference is saturated.

By the way, the rotational speed of the magnetic disc during the writing of the servo-tracks (servo-data) is in general about a half of the actual disc speed in order to enhance the positioning accuracy. For example, the rotational speed of a 3.5 type hard disc unit with which the applicants carried out the experiments, was 10,000 r.p.m. in the normal operation, and accordingly, the speed was set to 5,000 r.p.m. only during the writing of the servo-tracks.

In other words, it takes a time of 12 ms for one revolution of the magnetic disc. Further, in order to actually write servo-tracks, three revolutions per track are required since servo data of data tracks other than the instant track among track data are written. Accordingly, on the time base, it takes 36 ms=12 ms/rev. ×2 rev. for every track. In other words, data for 27.8 tracks are written for every one second.

The applicants have found from experiments carried out by themselves as mentioned above that deformation of about 0.5 $\mu$m due to 5 K per sec. is caused, and accordingly, a deviation of about 0.5 $\mu$m per 27.8 tracks as mentioned above, that is, a track deviation of 18 nm per track is caused (the track pitches become wider).

An allowable variation range of the magnetic disc apparatus is ±2.5%. That is, if it is out of the range of ±2.5%, the time for finely adjusting the position of the magnetic head with respect to a track becomes abruptly longer.

Presently available hard discs have track pitches of 50 KTPI (track per inch), that is about 0.5 $\mu$m. Accordingly, the above-mentioned deviation 18 nm is about 3.6% of the track pitches of 0.5 $\mu$m, and accordingly, is out of the allowable variation range. As a result, the head positioning speed is lowered, and the seek time becomes longer.

On the contrary, in order to restrain the deviation within the allowable variation range of ±2.5%, it should be set to below 12.5 nm due to 2.5% of 0.5 $\mu$m, that is, 0.35 $\mu$m for one second or 27.8 tracks. Thus, the magnetic head is changed at a rate of 0.35 $\mu$m/sec. which corresponds to a variation rate of 3.5 Ks in the temperature difference between the left and right (inner and outer peripheral) sides of the suspension around the head IC. Accordingly, in order to prevent the performance of the magnetic disc apparatus from being deteriorated by lowering the head positioning speed, that is, in order to prevent the seek time from becoming longer, it is understandable that the variation rate in the temperature difference should be restrained below 3.5 Ks.

Actually, there have been not only the deformation of the suspension but also many various factors causing variation of gains. In view of these factors causing variation of gains, allocation should be made for the deformation of the suspension, and finally, the allowable variation range has to be set to ±1.0%.

The same calculation as mentioned above is made with this allowable range, and therefore, 1.4 Ks is obtained. Accordingly, as clearly understood from this fact, even with the consideration of errors caused by factors other than the deformation, it is sufficient for preventing deterioration of the performance of the magnetic disc apparatus by lowering the head positioning speed or for preventing the seek time from becoming longer, to restrain the variation rate of the temperature difference below 1.4 Ks.

It is noted that this value is for track pitches in the present technology. Accordingly, if the technology would be advanced further so that the track pitches become more fine, it is clear that the variation rate of the temperature difference should be restrained to a less value. More specifically, lowering of the rotational speed of the disc during writing of tracks is one of factors causing the variation rate of the temperature difference to be retrained to a small value.

Figure 5:
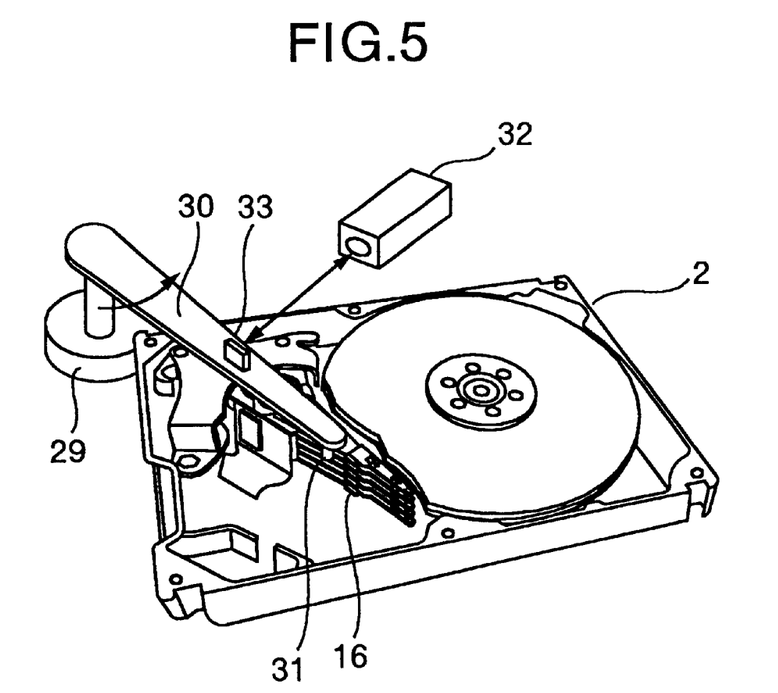
FIG. 5 is an external view illustrating an example of a servo-track writer.

Next explanation will be made of another embodiment which can prevent positional deviation of tracks even though the suspension is subjected to the temperature difference, with reference to FIG. 12 which is a plan view illustrating a magnetic disc apparatus similar to that shown in FIG. 5, but in which the external dive mechanism 29, the drive arm 30, the guide pin 31, and the laser length measuring machine 32 and the mirror 33, as shown in FIG. 5, are eliminated. Further, thermocouples (which are not shown in FIG. 12) as shown in FIG. 2 are provided on the inner and outer peripheral sides of the head IC (which is not shown).

In the magnetic disc apparatus having the above-mentioned configuration, a part 50 where data invalid for the magnetic disc apparatus are written is defined in the outermost peripheral part of a magnetic disc 11, the invalid data are spuriously written while the magnetic disc 11 is rotated without operating the external drive mechanism, maintaining the one and the same position, while temperatures on the inner and outer peripheral sides of the head IC are measured by mans of the thermocouples.

When the track data are spuriously written, the head IC generates heat so as to cause a temperature difference between the inner and outer peripheral sides of the head IC, as mentioned above, resulting in deformation of the suspension 15. At this stage, by monitoring the temperature data obtained from the thermocouples, after the time when the above-mentioned condition is established, that is, when the variation rate of the temperature difference becomes below 2.5 K/s or 1.4 K/s, actual track data are written by energizing the external drive mechanism. Accordingly, although the suspension 15 is deformed, the track data are written, allowing the suspension 15 to be deformed, the track pitches themselves are prevented from being deviated, thereby it is possible to obtain uniform track pitches.

Further, even though the temperatures are not monitored, it has been found that the variation in the temperature is settled within about 3 sec. as clearly understood from the above-mentioned experiments. Accordingly, if actual track data are written by means of the external drive mechanism after track data are spuriously written for at least 3 sec., uniform track pitches can be obtained without the track pitches themselves being deviated.

Figure 12:
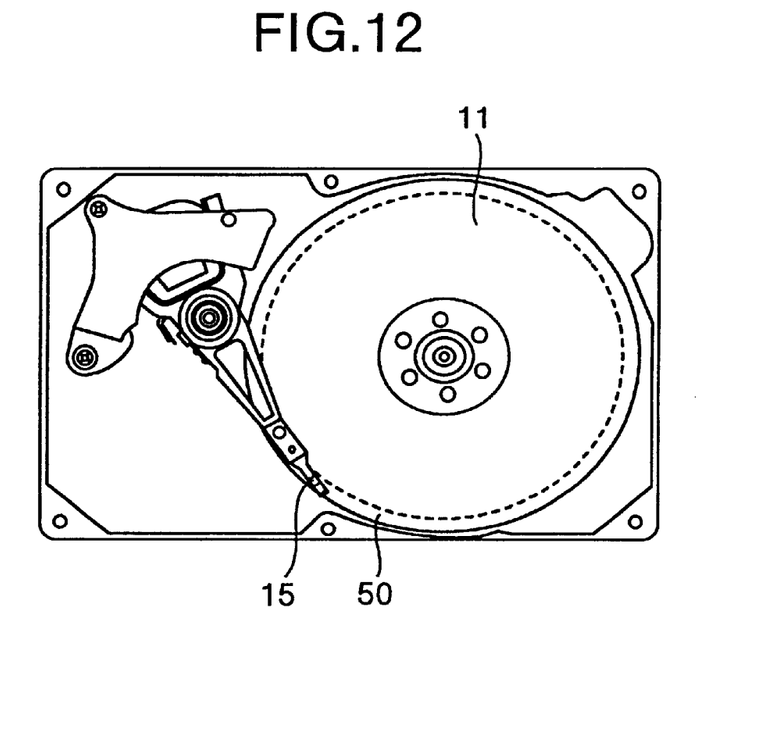
FIG. 12 is a view for explaining a counter measure for decreasing the temperature difference between the inner periphery and the outer periphery of the suspension.

It is noted that the part 50 where no data are written is set in the outermost peripheral part of the magnetic disc as shown in FIG. 12, the same technical effects and advantages can be obtained even though the part 50 is set in the innermost peripheral part of the magnetic disc or even in a part around the center of the disc.

Next, referring to FIGS. 13 to 17, explanation will be made of examples as countermeasures for preventing occurrence of temperature difference between the left and right (inner and outer peripheral) sides of the head IC, or for restraining the temperature difference therebetween to a slight value even though the temperature difference occurs.

Figure 3:
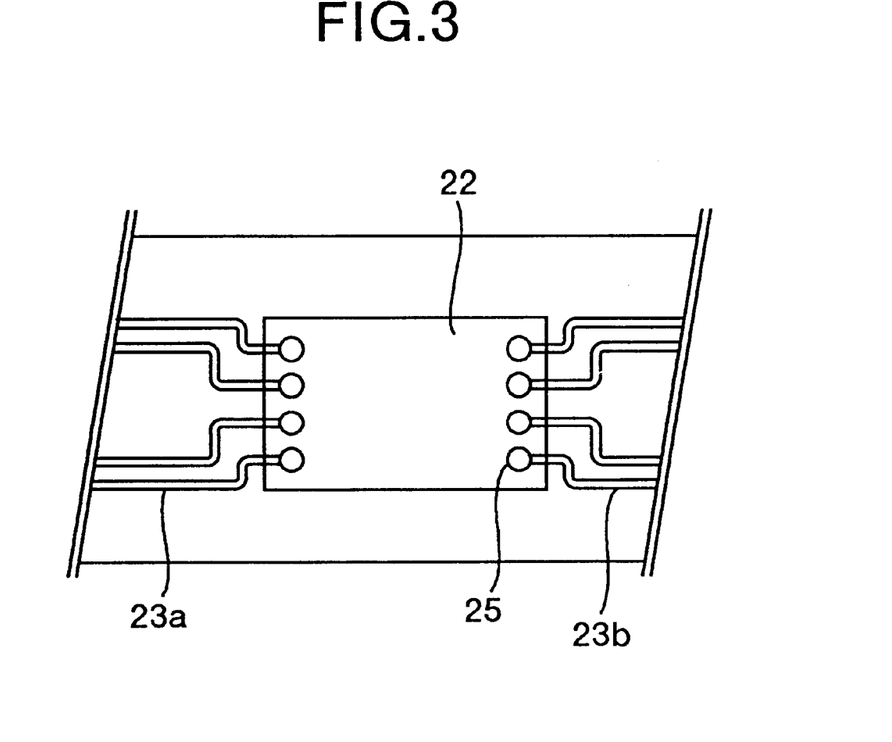
FIG. 3 is a plan view for explaining an head IC mounting part.
Figure 4:
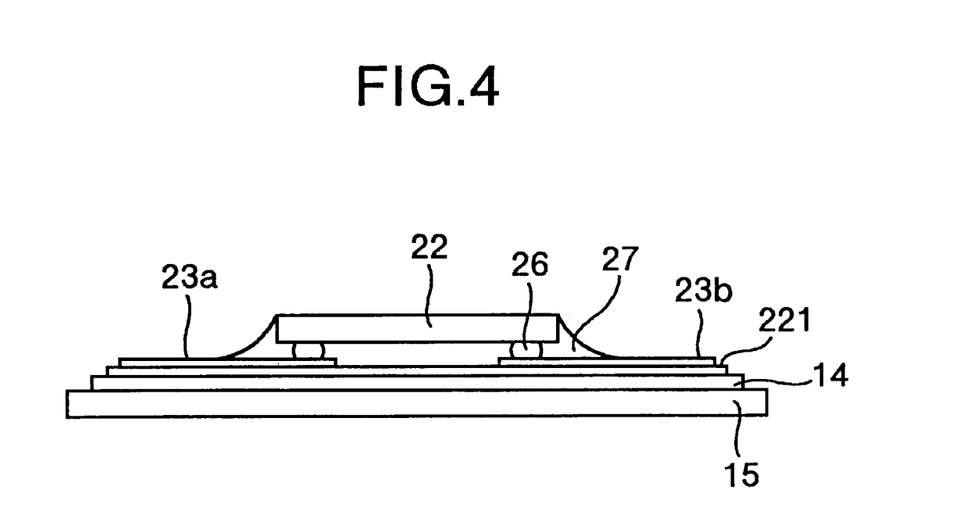
FIG. 4 is a sectional view for explaining the head IC mounting part.
Figure 13:
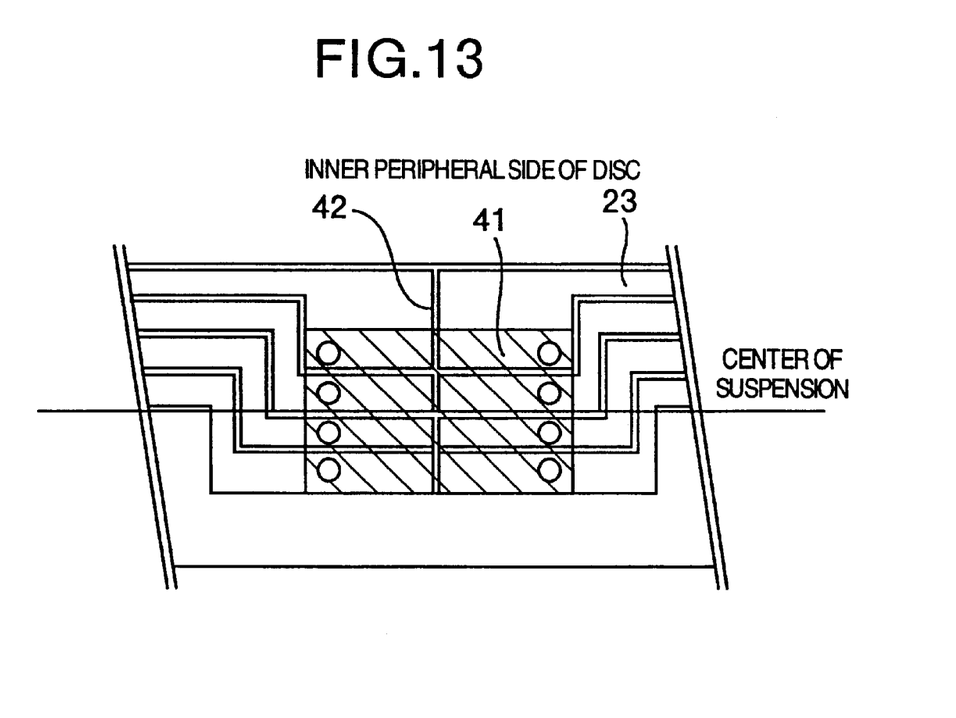
FIG. 13 is a first counter measure for decreasing the temperature difference between the inner periphery and the outer periphery of the suspension.

Referring to FIG. 13 which shows a first countermeasure having the same configuration as shown in FIG. 3, and in which the IC is also eliminated, a shaded part 41 is a part where the IC is attached. In this embodiment, wiring parts 23b are widened in comparison with that shown in FIG. 3, and the surface part 41 underneath the IC is prepared in its entirety in the form of wiring layers so that the wiring area on the inner peripheral side of the magnetic disc is greater than that on the outer peripheral side of the magnetic, with respect to the center of the suspension.

Since these wiring layers are made of copper (Cu), the heat conduction is better than that of other parts (stainless layers) where no wiring is formed. Accordingly, heat generated by the IC, can be transmitted well to the wiring layers in comparison with the stainless layers. In other words, the heat is conduced by a volume greater on the inner peripheral side than on the outer peripheral side of the magnetic disc, that is, the temperature is higher on the inner peripheral side than on the outer peripheral side.

Meanwhile, as mentioned above, wind induced from the magnetic disc on rotation blows in a direction from the inner peripheral side to the outer peripheral side thereof, and accordingly, the magnetic disc is cooled better on the inner peripheral side thereof than on the outer peripheral side thereof.

In view of the above, by transmitting a volume of heat larger to the inner peripheral side than to the outer peripheral side, the temperature difference between the inner and outer peripheral sides can be restrained to a small value.

Figure 14:
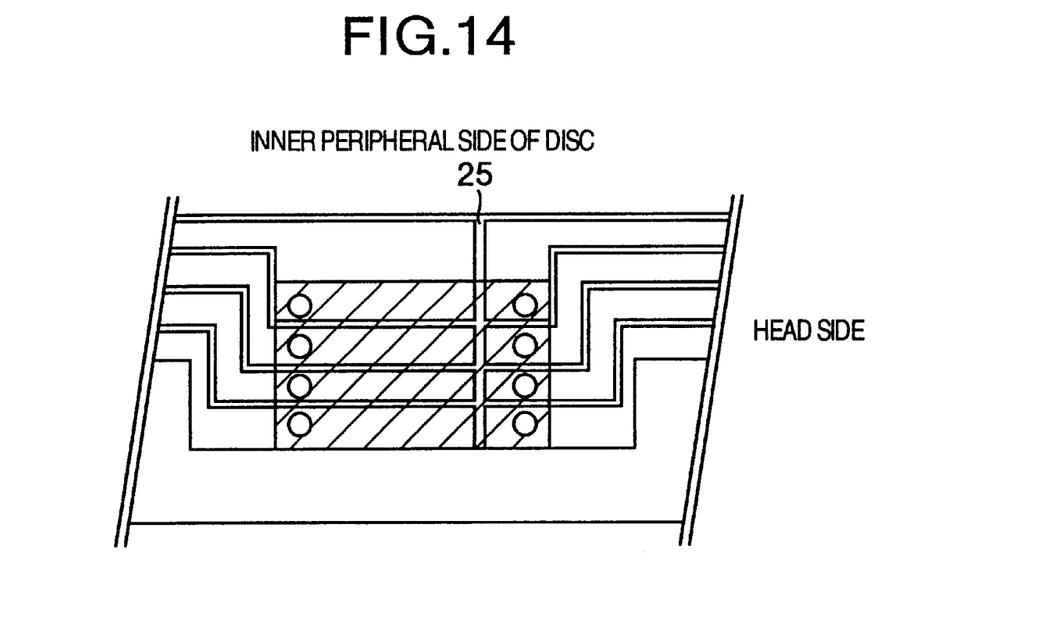
FIG. 14 is a second example of the counter measure for decreasing the temperature difference between the inner periphery and the outer periphery of the suspension.

Further, FIG. 14 shows a second example of the counter measures, which is the same as that shown in FIG. 13, except that the insulating part 42 is shifted from the center of the IC toward the magnetic head. With this arrangement, heat from the IC is transmitted to the side remote from the magnetic head.

Also in this configuration, the side remote from the magnetic head is cooled better than the side near to the magnetic head since wind induced from the magnetic disc on rotation blows from the side remote from the magnetic head, as mentioned above. Thereby it is possible to restrain the temperature difference between the inner peripheral side and the outer peripheral side to a small value in comparison with the configuration shown in FIG. 13.

Figure 15:
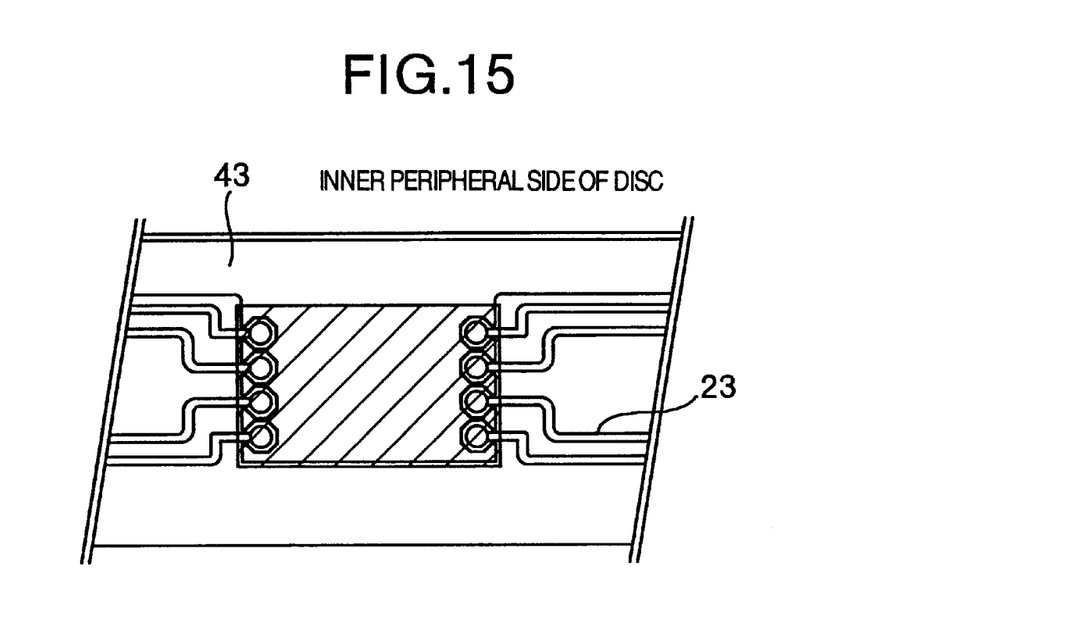
FIG. 15 is a third example of the counter measure for decreasing the temperature difference between the inner periphery and the outer periphery of the suspension.

Further, FIG. 15 shows a third example of the countermeasure, which is the same as that shown in FIG. 13 or 14, except that the wiring layer shown in FIG. 13 or 14 is used for a dummy wiring layer 43 that is different from the wiring for transmitting electric signals. This dummy wiring layer is provided for transmitting heat from the IC. Accordingly, there may be such an advantage that the shape thereof can be designed freely in comparison with the embodiments shown in FIGS. 13 and 14.

Figure 16:
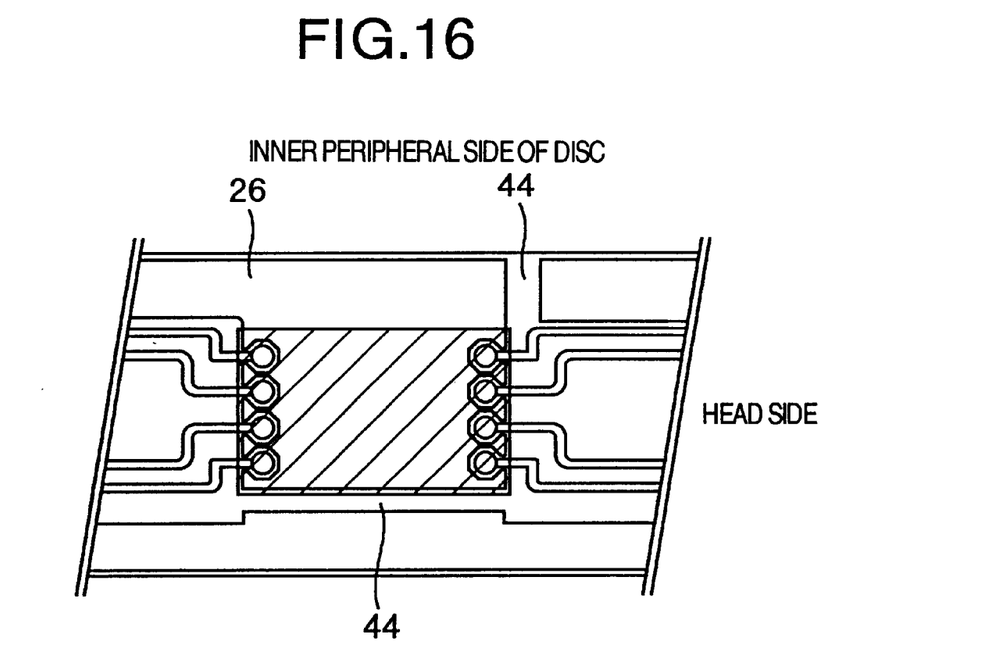
FIG. 16 is a fourth example of the counter measure for decreasing the temperature difference between the inner periphery and the outer periphery of the suspension.

For example, as shown in FIG. 16 which shows a fourth example of the countermeasures, a thermally insulating layer 44 is provided in a part of the dummy wiring layer 43 in order to improve the heat transmission to the side remote from the magnetic head, as shown in FIG. 14, and alternatively, there may be provided insulating layers which are symmetric in inner and outer peripheral directions of the magnetic disc. This embodiment which is mass-symmetric is advantageous for the performance of the suspension itself. Further, it goes without saying that the dummy wiring layer may be thicker than the signal wiring, and may be made of a material which is highly heat-conductible.

Figure 17:
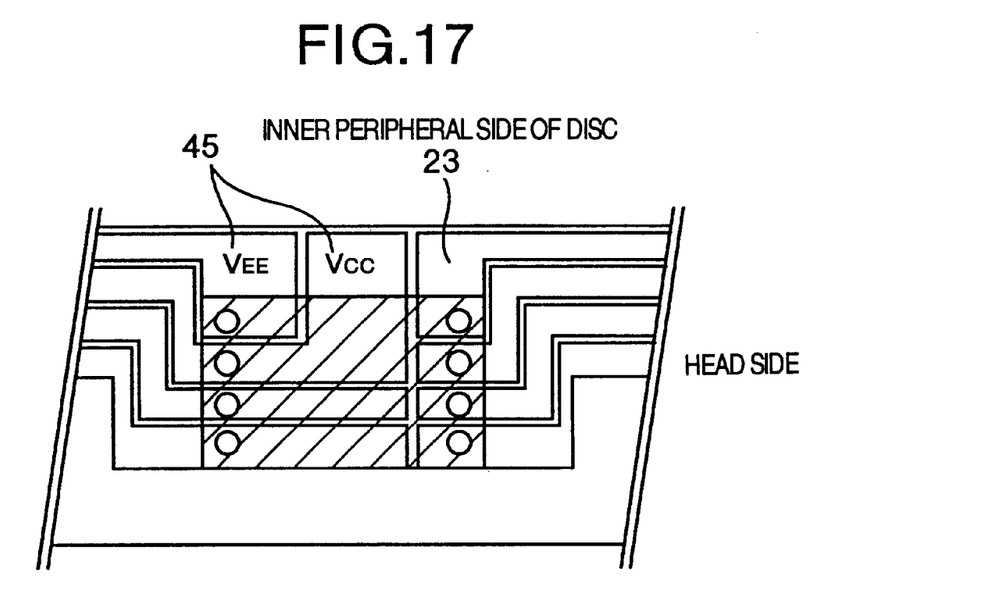
FIG. 17 is a fifth example of the counter measure for decreasing the temperature difference between the inner periphery and the outer periphery of the suspension.

Further, FIG. 17 shows a fifth example of the countermeasure. A power line 43 which generates heat by a highest value among lines in the head IC has a connection point which is preferentially located on the inner peripheral side of the disc. With this configuration, the heat generated from the IC chip is transmitted to the inner peripheral side of the magnetic disc, and accordingly, the power line 43 is preferentially cooled so as to lower the temperature difference between the inner and outer peripheral side.

Figure 18:
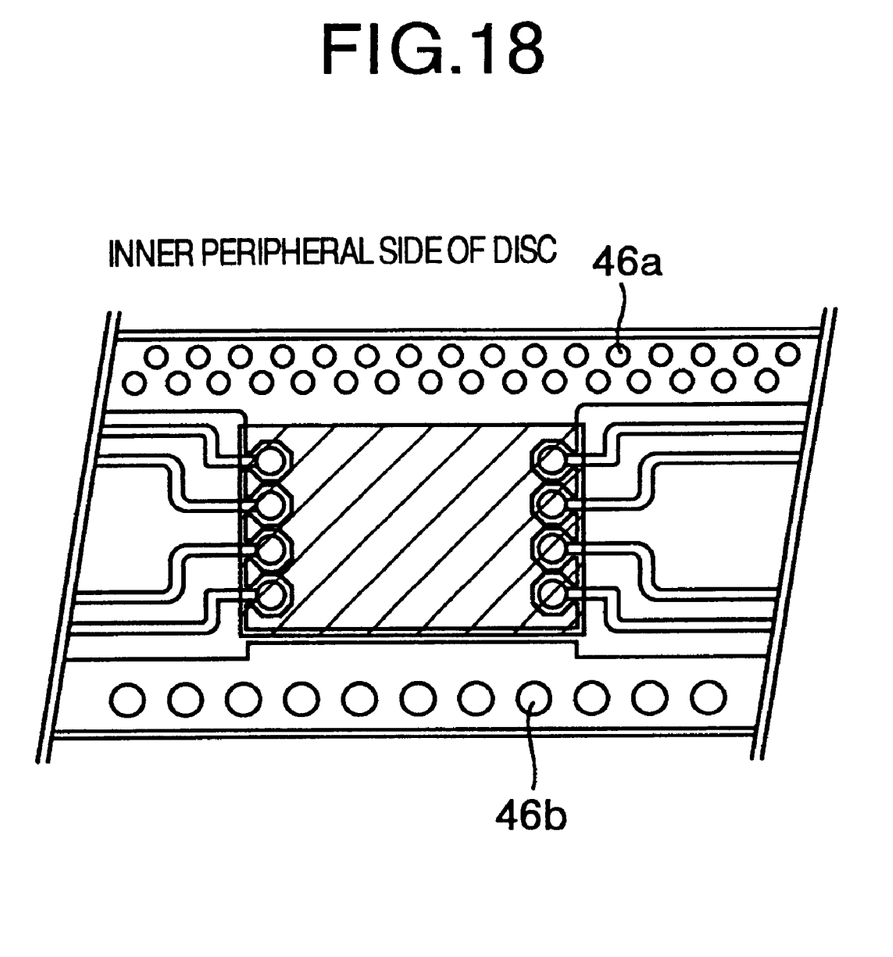
FIG. 18 is a sixth example of the counter measure for decreasing the temperature difference between the inner periphery and the outer periphery of the suspension.

FIG. 18 shows a sixth example of the countermeasure, that is, an embodiment in which the cooling effect is enhanced. It has been in general well-known, the larger the surface area of the object to be cooled, the higher the cooling effect. In this embodiment, minute perforation 46 is formed in the suspension so as to enlarge the surface area thereof in order to enhance the effect of heat radiation. The diameter of the perforation is smaller than the inner peripheral side than on the outer peripheral side, and further, the total area of the perforation on the inner peripheral side is set to be equal to that on the outer peripheral side in order to prevent the performance of the suspension itself from deteriorating while the heat radiation effect is higher on the inner peripheral side than on the outer peripheral side.

As mentioned above, according to the present invention, servo tracks can be written at substantially uniform pitches, thereby it is possible to restrain the seek time from becoming longer.

While we have shown and described several embodiments in accordance with our invention, it should be understood that disclosed embodiment are susceptible of changes and modification without departing from the scope of the inven-

What is claimed is:

1. A magnetic disc apparatus comprising a magnetic head for writing and reading data onto and from a magnetic disc; a slider for floating up the magnetic head from the magnetic disc on rotation; a suspension having an IC chip mounting surface, for supporting the slider; a positioning mechanism for positioning the magnetic head at a predetermined radial position; and an IC chip mounted on the IC mounting surface of the suspension at an IC chip mounting position, the IC chip mounting surface having an inner portion with respect to a center line passing through the IC chip mounting position and an outer portion with respect to the center line; wherein the IC chip mounting surface is characterized by having a rate of variation in temperature difference between its inner portion and its outer portion that is less than about 3.5 K/sec.

2. A magnetic disc apparatus as set forth in claim 1, wherein the rate of variation in temperature difference is less than about 1.4 K/sec.

3. A magnetic disc apparatus as set forth in claim 1, wherein a spurious writing condition exists until the rate of variation in temperature difference becomes lower than about 3.5 K/sec, wherein write operations performed during a spurious writing condition produce invalid data.

4. A magnetic disc apparatus as set forth in claim 1, wherein a spurious writing condition exists until the rate of variation in temperature difference becomes lower than about 1.4 K/sec, wherein write operations performed during a spurious writing condition produce invalid data.

5. A magnetic disc apparatus as set forth in claim 1, wherein write operations during a spurious writing condition are performed in a part of the magnetic disc other the in the data tracks for a period of at least 3 seconds, wherein write operations performed during a spurious writing condition produce invalid data.

6. A magnetic disc apparatus as set forth in claim 1, wherein the IC chip is an amplifier for signals adapted to write or read data onto and from the magnetic disc by means of the magnetic head.

7. A magnetic disc apparatus as set forth in claim 1, wherein the rate of variation in temperature difference is measured from a start of writing a servo-pattern.

8. A magnetic disc apparatus comprising a magnetic head for writing and reading data onto and from a magnetic disc; a slider for floating up the magnetic head from the magnetic disc on rotation; a suspension having an IC chip mounting surface, for supporting the slider; a positioning mechanism for positioning the magnetic head at a predetermined radial position; and an IC chip mounted on the IC mounting surface of the suspension at an IC chip mounting position, the IC chip mounting surface having an inner portion relative to a center line passing through the IC chip mounting position and an outer portion relative to the center line; wherein temperature variations between the inner portion and the outer portion are such that a spurious writing condition exists for at least three seconds, wherein write operations performed during a spurious writing condition produce invalid data.

9. A magnetic disc apparatus comprising a magnetic head for writing and reading data onto and from a magnetic disc; a slider for floating up the magnetic head from the magnetic disc on rotation; a suspension having an IC chip mounting surface, for supporting the slider; a positioning mechanism for positioning the magnetic head at a predetermined radial position; an IC chip mounted on the IC mounting surface of the suspension at an IC chip mounting position, and signal lines for the IC chip, the IC mounting surface having an inner peripheral side relative to a center line passing through the IC chip and an outer peripheral side relative to the center line; wherein those portions of the signal lines disposed on the inner peripheral side have a greater surface area than that of those portions of the signal lines disposed on the outer peripheral side.

10. A magnetic disc apparatus as set forth in claim 9, wherein the signal lines are formed with portions thereof that are directed toward the inner peripheral side of the magnetic disc.

11. A magnetic disc apparatus as set forth in claim 9 further comprising an insulating layer disposed along the inner peripheral side and toward a head side of the suspension.

12. A magnetic disc apparatus as set forth in claim 9 further comprising dummy copper lines formed proximate signal lines that are disposed on the inner peripheral side.

13. A magnetic disc apparatus as set forth in claim 9, wherein some of the signal lines are power lines, the power lines being disposed on the inner peripheral side.

14. A magnetic disc apparatus as set forth in claim 9, wherein the inner peripheral side includes a plurality of first openings and the outer peripheral side includes a plurality of second openings, the first openings being smaller than the second openings, the number of first openings being greater than number of second openings such that the total area of the first openings is substantially equal to the total area of the second.

* * * * *